United States Patent
Heddadj et al.

(10) Patent No.: US 7,091,306 B2
(45) Date of Patent: Aug. 15, 2006

(54) PROCESS FOR PREPARING POLYALKENYLSUCCINIMIDES

(75) Inventors: Mohammed Heddadj, Le Havre (FR); William R. Ruhe, Jr., Benicia, CA (US); Gilles P. Sinquin, Richmond, CA (US)

(73) Assignees: Chevron Oronite Company LLC, San Ramon, CA (US); Chevron Oronite S. A., San Ramon, CA (US)

( * ) Notice: Subject to any disclaimer, the term of this patent is extended or adjusted under 35 U.S.C. 154(b) by 0 days.

(21) Appl. No.: 10/435,432

(22) Filed: May 9, 2003

(65) Prior Publication Data

US 2004/0225105 A1 Nov. 11, 2004

(51) Int. Cl.
*C08G 69/26* (2006.01)
*C08G 69/10* (2006.01)
*C08G 69/02* (2006.01)

(52) U.S. Cl. .............. 528/328; 528/332; 528/335; 528/336; 528/363; 525/181; 525/183; 525/285; 525/301; 525/329.5; 525/418; 525/419; 525/420; 524/745

(58) Field of Classification Search ............... 528/328, 528/271, 335; 525/181, 183, 285, 301, 329.5, 525/336, 332, 335, 418–420, 363; 524/745
See application file for complete search history.

(56) References Cited

U.S. PATENT DOCUMENTS

| | | | |
|---|---|---|---|
| 4,240,803 A | 12/1980 | Andress, Jr. | |
| 4,482,357 A | 11/1984 | Hanlon | |
| 5,071,919 A | 12/1991 | DeGonia et al. | |
| 5,171,421 A * | 12/1992 | Forester | 208/48 AA |
| 5,194,142 A * | 3/1993 | Forester | 208/48 AA |
| 5,229,022 A | 7/1993 | Song et al. | |
| 5,342,505 A * | 8/1994 | Forester | 208/48 AA |
| 5,519,092 A * | 5/1996 | Blackborow | 525/285 |
| 5,523,417 A * | 6/1996 | Blackborow et al. | 549/233 |
| 5,565,528 A * | 10/1996 | Harrison et al. | 525/327.6 |
| 5,644,001 A | 7/1997 | Blackborow et al. | |
| 5,735,915 A * | 4/1998 | Gateau et al. | 44/347 |
| 5,739,355 A | 4/1998 | Gateau et al. | |
| 5,777,025 A | 7/1998 | Spencer et al. | |
| 6,156,850 A | 12/2000 | Harrison et al. | |
| 6,617,396 B1 * | 9/2003 | Harrison et al. | 525/301 |
| 6,867,171 B1 * | 3/2005 | Harrison et al. | 508/291 |
| 6,906,011 B1 * | 6/2005 | Harrison et al. | 508/192 |
| 2004/0180797 A1 * | 9/2004 | Huffer et al. | 508/232 |
| 2004/0225105 A1 * | 11/2004 | Heddadj et al. | 528/335 |

* cited by examiner

*Primary Examiner*—P. Hampton Hightower
(74) *Attorney, Agent, or Firm*—Claude J. Caroli; Alan W. Klaassen; Steven G. K. Lee

(57) ABSTRACT

The present invention relates to an improved process for preparing polyalkenylsuccinimides having a sediment level less than 0.1 vol % comprising the steps of:
(a) preparing a polyalkenyl derivative of an unsaturated acidic reagent by
  (i) reacting a polyalkylene with an unsaturated acidic reagent in the absence of a strong acid until at least 25% of the polyalkylene is converted to a polyalkenyl derivative of an unsaturated acidic reagent;
  (ii) continuing the reaction with an excess of the unsaturated acidic reagent in the presence of a strong acid to convert at least some of the unreacted polyalkylene to additional polyalkenyl derivative of an unsaturated acidic reagent; and
  (iii) removing the unreacted unsaturated acidic reagent;
(b) reacting the unfiltered product of step (a) with a polyamine having at least one basic nitrogen atom;
(c) diluting the product of step (b); and
(d) subsequently filtering the polyalkenylsuccinimide product.

32 Claims, No Drawings

PROCESS FOR PREPARING POLYALKENYLSUCCINIMIDES

The present invention relates to a process of preparing polyalkenylsuccinimides. More particularly, the present invention relates to an improved process for preparing chlorine-free and mineral oil-free polyalkenylsuccinimides having a sediment level less than 0.1 vol %. The polyalkenylsuccinimides made by the process of the present invention are particularly useful as ashless detergent additives for engine fuels.

BACKGROUND OF THE INVENTION

Hydrocarbyl succinimides, such as those derived from polyalkylene polyamines, are known materials which have been widely used as fuel detergents. For example, U.S. Pat. No. 4,240,803 describes the use of alkenyl succinimides in gasoline to reduce engine deposits. Also, U.S. Pat. No. 4,482,357 discloses additive mixtures for diesel fuels which include a hydrocarbyl succinimide or succinamide and the reduction of coke deposition by the use of these additive mixtures.

Additives are an important means of maintaining engine performance either by cleaning and/or lubricating moving parts of the engine. It is well known in the art to prepare hydrocarbyl substituted succinylating agents, and specifically polyisobutenyl succinic anhydrides (PIBSAs) by the reaction of a polyisobutene with maleic anhydride and to convert the PIBSAs to the corresponding succinimides by reaction with a polyethylene polyamine as described in U.S. Pat. No. 5,644,001. These succinimides are used as fuel additives for their ability to clean and/or maintain in a clean condition carburetors, manifolds, inlet valve ports, fuel injectors and the like in an internal combustion engine.

The polyisobutenyl succinic anhydride intermediate may be produced following two main processes. The first process consists of a direct thermal condensation reaction between maleic anhydride and polybutene and is often referred in the art as the thermal ene reaction. Elevated temperatures above 200° C. are required to obtain good reaction yields. These high temperatures lead to the formation of resin (sediment) which is believed to be due to the polymerization and/or decomposition of maleic anhydride. The formation of those insoluble resin or sediment in significant amounts requires a filtration stage before the PIBSA can be used as an additive or as an intermediate in the preparation of other products, e.g. succinimides for instance. Furthermore, according to U.S. Pat. No. 5,644,001, those undesirable resin, induce not only a significant discrepancy between the real and apparent succinylation in the maleinised product (due to the presence of resinified and/or unreacted maleic anhydride) but also adversely affect the detergency properties of such additives.

In the second type of process, the chlorination of the polybutene is first carried out, followed by the condensation of the chlorinated polybutene with maleic anhydride. This process can be carried out at lower temperature, than the thermal ene reaction process, with high yield and without the formation of substantial amounts of sediment. However, the polyisobutenyl succinic anhydride obtained with this process contains residual chlorine and environmental concerns related to chlorine-containing materials and potential formation of hazardous products, such as dioxins, that may arise under the conditions prevalent in an internal combustion engine, make the use of the second process undesirable. Furthermore, chlorine is also known to be a poison for the catalysts used for exhaust gas after treatment systems, i.e. as in catalytic converters.

As mentioned in the discussion above, the production of thermal PIBSAs and the corresponding succinimides normally results in resin and various other side products. Removing the resin and other side products require a filtration step, generally performed on pressure filters, e.g. Schenk-type filters, using a filter aid. Furthermore, the viscosity of PIBSAs and the corresponding succinimides makes this filtration step industrially difficult. Thus, prior dilution generally with mineral oil is generally performed to increase the filtration rate. After filtration, the resin saturated filter cake is disposed. However, a significant amount of desired product remains adsorbed on the filter cake as well and therefore results in reduced yield of the product.

As a consequence, there have been important development efforts made to reduce the amount of sediment formed during the ene process. The nature of the polyalkene plays a key role in the efficiency of the ene reaction and the amount of sediment formed during the reaction. Polybutene having a high concentration of terminal vinylidene bonds (greater than 50 wt %) are more reactive and leads to higher conversion and lower sediment. Those polybutenes, also called "reactive polybutene" have been achieved by $BF_3$-catalyzed polymerization of isobutylene. Conventional polybutenes, formed by cationic polymerization using aluminium chloride catalyst have a relatively low content of terminal double bonds (less than 20 wt %).

U.S. Pat. No. 5,071,919 discloses a process for preparing substituted succinic acylating agents by reacting an acidic reactant such as maleic anhydride with a substantially aliphatic polymer comprised principally or entirely of polyisobutenes in a mole ratio of acidic reactant:polymer of at least 1:1, provided that at least 50% of the polyisobutene content of the polymer has terminal vinylidene end groups and the reaction is maintained under super-atmospheric pressure during at least a substantial portion of the reaction period. The patent discloses that reaction product mixtures formed by this process contain little or no tars.

U.S. Pat. No. 5,229,022 which discloses the thermal ene reaction of ethylene-α-olefin polymers having a high terminal ethenylidene (i.e., vinylidene) content with monounsaturated carboxylic reactants in the presence of a catalyst system comprising at least one metallocene and an alumoxane compound. The patent discloses that the ethylene-α-olefin polymers readily undergo thermal ene reactions under conditions in which the formation of sediment or other byproducts contributing to product haze is greatly minimized or avoided altogether. It is further disclosed that the resulting ene reaction product mixture can be employed, without filtering, centrifuging, clarification, phase separation or other conventional product purification treatments.

U.S. Pat. No. 5,739,355 discloses a process for production of an alkenyl anhydride or polyalkenylsuccinic anhydride without forming resin by an ene-synthesis reaction between an olefin or a polyolefin, particularly polyisobutenes that have a content of external double bonds of more than 50%, and maleic anhydride in an aromatic solvent that is selected from toluene and xylenes.

Reagents have also been employed in the thermal ene reaction in order to reduce the formation of tars and sediment. It has been shown that the addition of a strong acid (such as sulfonic acid) to the process of preparing a polyalkenyl derivative of an unsaturated acidic reagent results in a faster rate of reaction, higher conversion, less sediment, and a lower succinic ratio.

U.S. Pat. No. 5,777,025 discloses a process for preparing polyalkenyl derivatives of monosaturated $C_4$ to $C_{10}$ dicarboxylic acid compounds containing insignificant amounts of sediment by reacting the dicarboxylic acid producing compound with a polyalkylene at high temperature and under high inert gas partial pressure above 2 atmospheres in the presence of a sediment-inhibiting amount of hydrocarbyl substituted sulfonic acid.

U.S. Pat. No. 6,156,850 discloses a process of reacting a polyalkene having a Mn of at least 300 with an unsaturated acidic reagent at elevated temperatures in the absence of a strong acid until at least 25% of the polyalkene is converted to a polyalkenyl derivative of an unsaturated acidic reagent, continuing the reaction of the polyalkene with an excess of the unsaturated acidic reagent at elevated temperatures in the presence of a strong acid to convert at least some of the unreacted polyalkene to additional polyalkenyl derivative of an unsaturated acidic reagent, and removing the unreacted unsaturated acidic reagent. The process may be conducted at atmospheric, sub-atmospheric or super-atmospheric. Preferably, the pressure is super-atmospheric. There is no disclosure in the patent that the process results in a product having low sediment, particularly a sediment level less than 0.1 wt %.

SUMMARY OF THE INVENTION

The present invention provides a simplified and cost effective process of preparing succinimides, particularly polyalkenylsuccinmides. That process is based on the discovery that the amination reaction can be performed on the unfiltered and undiluted polyalkenylsuccinic anhydride and provides a polyalkenylsuccinimide with low sediment having equivalent detergency properties than if the polyalkenylsuccinic anhydride is first filtrated before the amination procedure. The process of the present invention is very cost effective, which is attributed to the elimination of the filtration step of the polyalkenylsuccinic anhydride and the increase of production capacity due to the absence of diluent, i.e., solvent, when the amination reaction is performed. The process of the present invention may be conducted at low pressures (below 2 atmospheres) and results in a polyalkenylsuccinimide product having a sediment level less than 0.1 vol %, based on the total volume of the diluted product. The process of the present invention comprises the steps of:

(a) preparing a polyalkenyl derivative of an unsaturated acidic reagent by
  (i) reacting a polyalkylene having a Mn of at least 300 with an unsaturated acidic reagent at elevated temperatures and at a pressure below 2 atmospheres in the absence of a strong acid until at least 25% of the polyalkylene is converted to a polyalkenyl derivative of an unsaturated acidic reagent;
  (ii) continuing the reaction of the polyalkylene with an excess of the unsaturated acidic reagent at elevated temperatures and at a pressure below 2 atmospheres in the presence of a strong acid to convert at least some of the unreacted polyalkylene to additional polyalkenyl derivative of an unsaturated acidic reagent; and
  (iii) removing the unreacted unsaturated acidic reagent to yield an unfiltered polyalkenyl derivative of an unsaturated acidic reagent containing a sediment level of less than 0.1 wt %, based on the total weight of the polyalkenyl derivative of the unsaturated acidic reagent;

(b) reacting the unfiltered product of step (a) with a polyamine having at least one basic nitrogen atom;
(c) diluting the product of step (b) with mineral oil-free solvent; and
(d) subsequently filtering the diluted product to yield a polyalkenylsuccinimide product having a sediment level less than 0.1 vol %, based on the total volume of the diluted product.

In another embodiment, the present invention further provides a product produced by a process comprising the steps of:

(a) preparing a polyalkenyl derivative of an unsaturated acidic reagent by
  (i) reacting a polyalkylene having a Mn of at least 300 with an unsaturated acidic reagent at elevated temperatures and at a pressure below 2 atmospheres in the absence of a strong acid until at least 25% of the polyalkylene is converted to a polyalkenyl derivative of an unsaturated acidic reagent;
  (ii) continuing the reaction of the polyalkylene with an excess of the unsaturated acidic reagent at elevated temperatures and at a pressure below 2 atmospheres in the presence of a strong acid to convert at least some of the unreacted polyalkylene to additional polyalkenyl derivative of an unsaturated acidic reagent; and
  (iii) removing the unreacted unsaturated acidic reagent to yield an unfiltered polyalkenyl derivative of an unsaturated acidic reagent containing a sediment level of less than 0.1 wt %, based on the total weight of the polyalkenyl derivative of the unsaturated acidic reagent;

(b) reacting the product of step (a) with a polyamine having at least one basic nitrogen atom;
(c) diluting the product of step (b) with mineral oil-free solvent; and
(d) subsequently filtering the diluted product of step (c) to yield a polyalkenylsuccinimide product having a sediment level less than 0.1 vol %, based on the total volume of the diluted product.

Among other factors, the present invention is based on the surprising discovery that polyalkenylsuccinimides which are substantially free of undesirable sediment and resinous side products can be produced. The products of the present invention are excellent ashless, low viscosity detergents and are therefore useful as fuel additives employed in gasoline or diesel hydrocarbon fuels. Moreover, the low chlorine levels of the product of the present invention provide an environmental advantage.

DETAILED DESCRIPTION OF THE INVENTION

As stated above, the present invention relates to a process of preparing succinimide detergents. More particularly, the present invention relates to an improved process for preparing polyalkenylsuccinimides having sediment levels less than 0.1 vol %, preferably less than 0.05 vol %, more preferably less than 0.02 vol %, most preferably less than 0.01 vol %, based on the total volume of the diluted product. The process comprises the steps of:

(a) preparing a polyalkenyl derivative of an unsaturated acidic reagent by
  (i) reacting a polyalkylene having a Mn of at least 300 with an unsaturated acidic reagent at elevated temperatures and at a pressure below 2 atmospheres in the absence of a strong acid until at least 25% of the polyalkylene is converted to a polyalkenyl derivative of an unsaturated acidic reagent;

(ii) continuing the reaction of the polyalkylene with an excess of the unsaturated acidic reagent at elevated temperatures and at a pressure below 2 atmospheres in the presence of a strong acid to convert at least some of the unreacted polyalkylene to additional polyalkenyl derivative of an unsaturated acidic reagent; and (iii) removing the unreacted unsaturated acidic reagent to yield an unfiltered polyalkenyl derivative of an unsaturated acidic reagent containing a sediment level of less than 0.1 wt %, based on the total weight of the polyalkenyl derivative of the unsaturated acidic reagent;

(b) reacting the unfiltered product of step (a) with a polyamine having at least one basic nitrogen atom;

(c) diluting the product of step (b) with mineral oil-free solvent; and (d) subsequently filtering the diluted product to yield a polyalkenylsuccinimide product having a sediment level less than 0.1 vol %, based on the total volume of the diluted product.

The Polyalkylene

The polyalkylene can be a polymer of a single type of olefin, or it can be a copolymer of two or more types of olefins. Preferably, the polyalkylene is a polybutene, more preferably a polyisobutene, and most preferably a polyisobutene wherein at least 50% of the polyisobutene has methylvinylidene end groups. Preferably, the polyalkylene has a number average molecular weight (Mn) of at least 300, preferably from about 500 to 2500, and more preferably, the Mn of the polyalkylene is from about 500 to 1300.

The Unsaturated Acidic Reagent

The term "unsaturated acidic reagent" refers to maleic or fumaric reactants of the general formula:

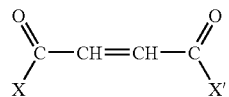

wherein X and X' are the same or different, provided that at least one of X and X' is a group that is capable of reacting to esterify alcohols, form amides, or amine salts with ammonia or amines, form metal salts with reactive metals or basically reacting metal compounds and otherwise function as acylating agents. Typically, X and/or X' is —OH, —O-hydrocarbyl, —NH$_2$, and taken together X and X' can be —O— so as to form an anhydride. Preferably, X and X' are such that both carboxylic functions can enter into acylation reactions. Maleic anhydride is a preferred unsaturated acidic reactant. Other suitable unsaturated acidic reactants include electron-deficient olefins such as monophenyl maleic anhydride; monomethyl, dimethyl, maleic anhydride, N-phenyl maleimide and other substituted maleimides; isomaleimides; fumaric acid, maleic acid, alkyl hydrogen maleates and fumarates, dialkyl fumarates and maleates, fumaronilic acids and maleanic acids; and maleonitrile, and fumaronitrile.

The Strong Acid

The strong acid used in the process of the present invention helps to increase conversion of the polyalkylene and unsaturated acidic reagent to the polyalkenyl derivative of an unsaturated acidic reagent. Among other factors, it also helps to lower the amount of sediment formed during the conversion.

The term "strong acid" refers to an acid having a pK$_a$ of less than about 4. Preferably, the strong acid is an oil-soluble, strong organic acid. More preferably, the strong acid is a sulfonic acid. Still more preferably, the sulfonic acid is an alkyl aryl sulfonic acid. Most preferably, the alkyl group of the alkyl aryl sulfonic acid has from about 4 to 30 carbon atoms.

Preferably, the sulfonic acid is present in an amount in the range of from about 0.0025 wt % to 1.0 wt %, more preferably 0.025 wt % to 0.1 wt %, and most preferably, 0.05 to 0.1 wt %, based on the total weight of polyalkylene.

Preparing the Polyalkenyl Derivative of an Unsaturated Acidic Reagent

In the preparation of the polyalkenyl derivative of an unsaturated acidic reagent, the mole ratio of unsaturated acidic reagent to polyalkylene is preferably at least 1.0:1. More preferably, that mole ratio is from about 1.0:1 to 4.0:1.

Preferably, the unsaturated acidic reagent is added over an extended time period (such as from about ½ to 4 hours) instead of all at once, in order to get high conversion and minimize sediment.

In step (i) of the process, the polyalkylene is reacted with an unsaturated acidic reagent at elevated temperatures and at a pressure below 2 atmospheres in the absence of a strong acid until at least 25% of the polyalkylene is converted to a polyalkenyl derivative of an unsaturated acidic reagent. Preferably, between about 25% and 80% of the polyalkylene is converted to polyalkenyl derivative in the absence of a strong acid. More preferably, between about 60% and 75% of the polyalkylene is converted to polyalkenyl derivative in the absence of a strong acid. In practice, this is achieved by adding the strong acid at the end of the addition of the unsaturated acidic reagent.

One can measure the % conversion of the reaction by any means known to someone skilled in the art. For example one method for measuring the weight % actives is to separate unreacted polyisobutene from the product with column chromatography using a non-polar solvent such as, for example, hexane, where the column is packed with silica gel, alumina, or other suitable adsorbent. In this case, the unreacted polyisobutene is eluted by the hexane, and the PIBSA is retained on the column. After the hexane is evaporated from the sample that is eluted, the unreacted polybutene is weighed. Then subtraction of the weight of the unreacted polybutene from the total weight of sample added to the column, and then dividing this by the total weight of sample and multiplication by 100, gives the weight % actives. The % conversion is calculated from the weight % actives using the procedure described in U.S. Pat. No. 5,625,004.

In step (ii), the reaction is continued with an excess of unsaturated acidic reagent at elevated temperatures and at a pressure below 2 atmospheres in the presence of a strong acid to convert at least some of the unreacted polyalkylene to additional polyalkenyl derivative of an unsaturated acidic reagent.

The temperature of the reaction in steps (i) and (ii) can vary over a wide range. Preferably, the temperature is in the range of from about 180° C. to 240° C. The pressure at which the reaction occurs is below 2 atmospheres, from about 1.4 to 1.9 atmospheres, and more preferably from about 1.5 to 1.8 atmospheres.

In step (iii), the unreacted unsaturated acidic reagent is removed by vacuum distillation, yielding an unfiltered, undiluted polyalkenyl derivative of an unsaturated acidic reagent containing a sediment level of less than 0.1 wt %, preferably less than 0.05 wt %, more preferably less than 0.02 wt %, and most preferably less than 0.01 wt %, based on the total weight of the polyalkenyl derivative of the unsaturated acidic reagent.

Further details of steps (a)(i) through (a)(iii) may be found in U.S. Pat. No. 6,156,850 and the disclosure which is hereby incorporated for all purposes.

Preparing the Polyalkenylsuccinimides

The polyalkenylsuccinimide can be prepared by reacting the unfiltered, undiluted polyalkenyl derivative of an unsaturated acidic reagent, produced by the reactions described in the previous section, with a polyamine having at least one basic nitrogen atom. The polyamine should be employed in amounts such that there are about 0.1 to 1.5 equivalents of polyamine per equivalent of acidic groups in the polyalkenyl derivative of an unsaturated acidic reagent. Preferably, a polyamine is used having at least three nitrogen atoms and about 4 to 20 carbon atoms, preferably having four nitrogen atoms. Typically, the reaction is conducted at temperatures in the range of from about 60° C. to 180° C., preferably about 150° C. to 170° C. for from about 30 minutes to about 6 hours, preferably about 1 to 3 hours. Typically, the reaction is conducted at about atmospheric pressure; however, higher or lower pressures can also be used. Water, present in the system or generated by this reaction, is preferably removed from the reaction system during the course of the reaction via stripping under nitrogen. Reduced pressures can be applied to facilitate the elimination of the water formed during the reaction.

Suitable polyamines can have a straight- or branched-chain structure and may be cyclic, acyclic, or combinations thereof. Generally, the amine nitrogen atoms of such polyamines will be separated from one another by at least two carbon atoms, i.e., polyamines having an aminal structure are not suitable. The polyamine may also contain one or more oxygen atoms, typically present as an ether or a hydroxyl group. Polyamines having a carbon-to-nitrogen ratio of from 1:1 to about 10:1 are particularly preferred.

In preparing the compounds of the present invention using a polyamine where the various nitrogen atoms of the polyamine are not geometrically equivalent, several substitutional isomers are possible and each of these possible isomers is encompassed within the present invention.

A particularly preferred group of polyamines for use in the present invention are polyalkylene polyamines, including alkylene diamines. Such polyalkylene polyamines will typically contain about 2 to 12 nitrogen atoms and about 2 to 24 carbon atoms. Preferably, the alkylene groups of such polyalkylene polyamines will contain from about 2 to 6 carbon atoms, more preferably from about 2 to 4 carbon atoms.

Particularly suitable polyalkylene polyamines are those having the formula:

$$H_2N-(R_1NH)_a-H$$

wherein $R_1$ is a straight- or branched-chain alkylene group having about 2 to 6 carbon atoms, preferably about 2 to 4 carbon atoms, most preferably about 2 carbon atoms, i.e., ethylene ($-CH_2CH_2-$); and $a$ is an integer from 1 to about 10, preferably 1 to about 4, and more preferably 3.

Examples of suitable polyalkylene polyamines include ethylenediamine, propylenediamine, isopropylenediamine, butylenediamine, pentylenediamine, hexylenediamine, diethylenetriamine, dipropylenetriamine, dimethylaminopropylamine, diisopropylenetriamine, dibutylenetriamine, di-sec-butylenetriamine, triethylenetetraamine, tripropylenetetraamine, triisobutylenetetraamine, tetraethylenepentamine, pentaethylenehexamine, dimethylaminopropylamine, and mixtures thereof.

Particularly preferred polyalkylene polyamines are ethylenediamine, diethylenetriamine, triethylenetetraamine, and tetraethylenepentamine. More preferred are ethylenediamine, diethylenetriamine, and triethylenetetraamine. Most preferably, polyalkylene polyamine is especially triethylenetetraamine.

Many of the polyamines suitable for use in the present invention are commercially available and others may be prepared by methods which are well known in the art. For example, methods for preparing amines and their reactions are detailed in Sidgewick's "The Organic Chemistry of Nitrogen", Clarendon Press, Oxford, 1966; Noller's "Chemistry of Organic Compounds", Saunders, Philadelphia, 2nd Ed., 1957; and Kirk-Othmer's "Encyclopedia of Chemical Technology", 2nd Ed., especially Volume 2, pp. 99–116.

At the conclusion of the reaction, the resulting polyalkenylsuccinimide is diluted with a mineral oil-free solvent, preferably an aromatic solvent. The use of an aromatic solvent is particularly suitable to facilitate filtration due to the lowering of the product viscosity, which allows the use of less expensive filtration methods, e.g. for instance filtration using bag or cartridge filters, without the use of filter aid. The absence of mineral oil is particularly advantageous in fuel additive applications. Indeed, when used as a gasoline detergent, the presence of mineral oil diluent will induce the formation of combustion chamber deposits (CCD).

For example, the aromatic solvent, used for the dilution of the succinimide, may be selected from the group consisting of toluene, xylene, light alkylate, Aromatic 100, Aromatic 150, Aromatic 200, Shellsolv AB, Caromax 20, Caromax 29 and HAN 857. For safety issues, aromatic solvents with a high flash point are preferred. More preferably, the aromatic solvent is light alkylate, which is a mixture of low molecular weight alkylbenzene ($C_3-C_{9+}$). This solvent can be purchased from companies producing branched alkylbenzene (BAB) or linear alkylbenzene (LAB). In the present invention, light alkylates obtained from BAB distillation are preferred. The aromatic solvent is preferably present in the polyalkenylsuccinimide in an amount of about 20 to 50 wt %, and more preferably in an amount of about 30 to 40 wt %.

The process of the present invention is characterized by the substantial absence of sediment. Typically, the sediment level of the polyalkenylsuccinimide product will be below 0.1 vol %, based on the total volume of the diluted product, i.e., polyalkenylsuccinimide. Preferably, the sediment level of the polyalkenylsuccinimide product will be below 0.05 vol %, more preferably less than 0.02 vol %, and most preferably less than 0.01 vol %, based on the total volume of the diluted product.

The products of the process of the present invention are useful per se as detergents for fuel additives in gasoline and diesel fuels and the like. The absence of mineral oil in the diluted product enhances their usefulness as fuel additives since mineral oils tend to contribute toward the formation of combustion chamber deposits (CCD). The products of the process of the present invention have also chlorine levels below 10 ppm, making them highly desirable alternative additives compared to comparable products produced by the chlorination PIBSA process.

EXAMPLES

The invention will be further illustrated by the following examples, which set forth particularly advantageous method embodiments. While the Examples are provided to illustrate the present invention, they are not intended to limit it. This application is intended to cover those various changes and substitutions that may be made by those skilled in the art without departing from the spirit and scope of the appended claims.

Example 1

1000 parts of high methylvinylidene polyisobutene (PIB) having a Mn of about 1000 (BASF Glissopal 1000, 88% methylvinylidene content) was added to a stainless steel reactor. The reactor was heated to 220° C. under a nitrogen atmosphere. Once the reactor reached 220° C., the reactor was held at these conditions for PIB dehydration for 15 minutes. After dehydration, the reactor was pressurized to approximately 1.7 atmospheres using nitrogen. Once the reactor reached this pressure, the first addition of maleic anhydride (MA), corresponding to a MA:PIB mole ratio of 1.49:1, was added at a constant rate, in the absence of sulfonic acid. The reaction conditions were maintained for 90 minutes. After this time, the second addition of MA, corresponding to a MA:PIB mole ratio of 0.51:1, was added at a constant rate over 21 minutes. At the end of the second maleic anhydride addition, 0.05 wt % of $C_4$–$C_{30}$ alkyl sulfonic acid was added to the reactor. The reaction conditions were maintained two additional hours under an absolute pressure of 1.7 atmospheres. After this period, the reactor was depressurized to atmospheric pressure. Then, a vacuum was slowly applied, and the reactor depressurized to less than 50 mm mercury (absolute) in order to remove the excess of maleic anhydride. Once the reactor pressure reached less than 50 mm mercury (absolute), this condition was held for about 1 hour. At the end of this hold period, the reactor was pressurized with nitrogen to atmospheric pressure and cooled down. The unfiltered, undiluted polyisobutenyl succinic anhydride (PIBSA) has a saponification number of 118 mg KOH/g, an active content of 91.5 wt % and sediment of 0.045 wt %.

1000 parts of unfiltered PIBSA were charged into a reactor equipped with a mechanical stirrer, thermometer, and nitrogen inlet. Under nitrogen flow, the PIBSA was heated to about 70° C. 138.1 parts of commercial triethylenetetramine (TETA, purchased from Delamine Corporation) was added over a 15 minute period. After the end of the TETA addition, the temperature was raised to 165° C. and maintained for 1 hour. After the holding period, the water formed during the reaction was removed by nitrogen stripping under reduced pressure (30 mm Hg) over a 45 minute period. The reaction mixture was cooled to 110° C. and diluted using 706.5 parts of light alkylate (available from Chevron Oronite Company LLC). The diluted material was filtered using 1 μm polyester filter media and analyzed. The diluted polyalkenylsuccinimide product has a solvent content: 37.8 wt %, percent nitrogen: 2.81 wt %, color (ASTM D1500): 2.5D, and sediment: 0.01 vol % (0.02 vol % before filtration).

Example 2

The PIBSA was produced in a similar manner as described in Example 1 using the same reactants except that the MA was added in a single addition. The reactor was heated to 220° C. After dehydration of the PIB, the maleic anhydride, corresponding to a MA:PIB mole ratio of 2:1, was added at a constant rate over 3.0 hours. At the end of the MA addition, 0.1 wt % of the sulfonic acid was added. The reactor was then slowly heated to 232° C. over a one hour period. The stripping of the unreacted MA was started 30 minutes after the end of the MA addition following the same procedure as described in Example 1. The obtained unfiltered, undiluted polyisobutenyl succinic anhydride (PIBSA) has a saponification number of 119.5 mg KOH/g, an active content of 91.2 wt % and sediment of 0.004 wt % (0.01 vol %).

Using the general conditions described in Example 1, 1000 parts of unfiltered PIBSA from Example 2 were charged into four neck reactor and heated to about 70° C. 140.2 parts of commercial triethylenetetramine (TETA, purchased from Delamine Corporation) were added. After stripping of the water formed during the reaction and cooling down, the product was diluted using 731.5 parts of the light alkylate. The diluted material was filtered using 1 μm polyester filter media and analyzed. The diluted polyalkenylsuccinimide product has a solvent content: 39.5 wt %, percent nitrogen: 2.78 wt %, color (ASTM D1500): 2.6D, and sediment: 0.005 vol % (0.01 vol % before filtration).

Comparative Example A

The same reactants and the same general procedure were used as described in Example 1, except with a MA:PIB mole ratio of 1.6:1 and no sulfonic acid catalyst. The PIB dehydration was performed at 175° C. The first addition of maleic anhydride, corresponding to a MA:PIB mole ratio of 0.46:1, was added at a constant rate over 15 minutes at 175° C. The temperature was increased to 210° C. and the rest of the maleic anhydride was added at a constant rate over 100 minutes. After the end of the maleic anhydride addition, the reaction temperature was maintained during 5 hours under an absolute pressure of about 1.7 atmospheres. The unreacted maleic anhydride was eliminated in the same manner as described in Example 1. The unfiltered, undiluted polyisobutenyl succinic anhydride (PIBSA) has a saponification number of 114 mg KOH/g, an active content of 84.5 wt % and sediment of 0.02 vol %.

The uncatalyzed PIBSA was first diluted with 20.5 wt % of an aromatic solvent (Caromax 20 purchased from Carless) and filtered through filter aid. The filtered and diluted PIBSA has a saponification number of 94.8 mg KOH/g and sediment content of 0.005 vol %. 1000 parts of the filtered PIBSA was reacted with 111.2 parts of TETA (Delamine Corporation) at 165° C. for one hour. The water formed during the reaction was eliminated by distillation at atmospheric pressure. After cooling down, the succinimide was further diluted with the aromatic solvent to target the same nitrogen content as Examples 1 and 2 (e.g. 2.8 wt %). The diluted material was analyzed as having a solvent content: 33.3 wt %, percent nitrogen: 2.81 wt %, color (ASTM D1500): 2.5D, sediment: 0.005 vol %.

Example 3

XUD9 Engine Performance

The Peugeot XUD9 Nozzle Fouling Test (CEC F-23-A-01) was used to evaluate the detergency properties of products obtained in the process of the present invention. Each test was carried out in CEC-R-F93-T-95/3 reference fuel, purchased from Haltermann, whose characteristics are shown in Table 1.

TABLE 1

| Tests | Unit | RF93-T-95/3 |
|---|---|---|
| Density @ 15° C. | Kg/l | 0.841 |
| Sulfur Content | ppm w/w | 346 |
| Distillation | | |
| Initial Point | ° C. | 195 |
| 5% | ° C. | 228.4 |
| 10% | ° C. | 239.2 |
| 20% | ° C. | 251 |
| 30% | ° C. | 260.2 |
| 40% | ° C. | 269.1 |
| 50% | ° C. | 277.4 |
| 60% | ° C. | 288.1 |
| 70% | ° C. | 299.4 |
| 80% | ° C. | 313.6 |
| 90% | ° C. | 332.7 |
| 95% | ° C. | 352.3 |
| Final Point | ° C. | 362.8 |

Each test was compared to base fuel alone. The solvent concentration of the polyalkenylsuccinimides was adjusted to target the same active material content (e.g., 2.8 wt % nitrogen) and the polyalkenylsuccinimides were tested at the same treat rate. Results are shown in Table 2. The residual flow provides an indication of deposit buildup in the fuel injector. The higher the residual flow, the less deposit buildup. The results show similar performance between the polyalkenylsuccinimide prepared by the process of the present invention and the succinimide of the comparative example and thus demonstrate no detrimental effect due to performing the amination reaction on the unfiltered PIBSA. However, the polyalkenylsuccinimides of the present invention described in Examples 1 and 2 are advantageously more cost effective due to (1) the use of sulfonic acid leading to higher polyisobutylene conversion and low sediment polyisobutylene succinic acid anhydrides; and (2) the suppression of an expensive PIBSA filtration step and the reduction of waste materials such as the filtration head.

TABLE 2

| Fuel tested | Residual flow at 0.1 mm needle lift |
|---|---|
| Base fuel | 8.3% |
| Base fuel + 55 ppm w/w of Example 1 | 19.5% |
| Base fuel + 110 ppm w/w of Example 1 | 23.6% |
| Base fuel + 55 ppm w/w of Comparative Example A | 19.2% |
| Base fuel + 110 ppm w/w of Comparative Example A | 23.0% |

What is claimed is:

1. A process of preparing polyalkenylsuccinimides comprising the steps of:
   (a) preparing a polyalkenyl derivative of an unsaturated acidic reagent by
      (i) reacting a polyalkylene having a Mn of at least 300 with an unsaturated acidic reagent at elevated temperatures in the range of from about 180° C. to 240° C. and at a pressure below 2 atmospheres in the absence of a strong acid until at least 25% of the polyalkylene is converted to a polyalkenyl derivative of an unsaturated acidic reagent;
      (ii) continuing the reaction of the polyalkylene with an excess of the unsaturated acidic reagent at elevated temperatures in the range of from about 180° C. to 240° C. and at a pressure below 2 atmospheres in the presence of a strong acid having a $pK_a$ of less than about 4 to convert at least some of the unreacted polyalkylene to additional polyalkenyl derivative of an unsaturated acidic reagent; and
      (iii) removing the unreacted unsaturated acidic reagent to yield an unfiltered polyalkenyl derivative of an unsaturated acidic reagent containing a sediment level of less than 0.1 wt %, based on the total weight of the polyalkenyl derivative of the unsaturated acidic reagent;
   (b) reacting the unfiltered product of step (a) with a polyamine having at least one basic nitrogen atom;
   (c) diluting the product of step (b) with mineral oil-free solvent; and
   (d) subsequently filtering the diluted product of step (c) to yield a polyalkenylsuccinimide product having a sediment level less than 0.1 vol %, based on the total volume of the diluted product.

2. The process according to claim 1 wherein in step (a), the polyalkylene is reacted with the unsaturated acidic reagent in the absence of a strong acid until between about 25% and 80% of the polyalkylene is converted to the polyalkenyl derivative of an unsaturated acidic reagent.

3. The process according to claim 1 wherein in step (a), the polyalkylene is reacted with the unsaturated acidic reagent in the absence of a strong acid until between about 60% and 75% of the polyalkylene is converted to the polyalkenyl derivative of an unsaturated acidic reagent.

4. The process according to claim 1 wherein the polyalkylene is a polybutene.

5. The process according to claim 4 wherein the polybutene is a polyisobutene.

6. The process according to claim 5 wherein at least 50% of the polyisobutene has methylvinylidene end groups.

7. The process according to claim 1 wherein the polyalkylene has a Mn of from about 500 to 2500.

8. The process according to claim 7 wherein the polyalkylene has a Mn of from about 500 to 1300.

9. The process according to claim 1 wherein the unsaturated acidic reagent is maleic anhydride.

10. The process according to claim 1 wherein the mole ratio of unsaturated acidic reagent to polyalkylene is at least 1.0:1.

11. The process according to claim 1 wherein the reaction is conducted at a pressure from about 1.4 to 1.9 atmospheres.

12. The process according to claim 1 wherein the reaction is conducted at a pressure from about 1.5 to 1.8 atmospheres.

13. The process according to claim 1 wherein the strong organic acid is a sulfonic acid.

14. The process according to claim 13 wherein the sulfonic acid is an alkyl aryl sulfonic acid.

15. The process according to claim 14 wherein the alkyl group of the alkyl aryl sulfonic acid has from about 4 to 30 carbon atoms.

16. The process according to claim 15 wherein the sulfonic acid is present in an amount in the range of from about 0.0025% to 1.0 wt % based on the total weight of polyalkylene.

17. The process according to claim 15 wherein the sulfonic acid is present in an amount in the range of from about 0.025% to 0.1 wt % based on the total weight of polyalkylene.

18. The process according to claim 15 wherein the sulfonic acid is present in an amount in the range of from about 0.05% to 0.1 wt % based on the total weight of polyalkylene.

19. The process according to claim 1 wherein the polyamine has from about 2 to 12 amine nitrogen atoms and from about 2 to 24 carbon atoms.

20. The process according to claim 19 wherein the polyamine is derived from a polyalkylene polyamine containing from about 2 to 12 amine nitrogen atoms and from about 2 to 24 carbon atoms.

21. The process according to claim 20 wherein the polyalkylene polyamine has the formula:

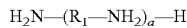

wherein $R_1$ is an alkylene group having from about 2 to 6 carbon atoms and a is an integer from 1 to about 10.

22. The process according to claim 21 wherein a is an integer from 1 to about 4.

23. The process according to claim 21 wherein $R_1$ is from about 2 to 4 carbon atoms.

24. The process according to claim 21 wherein the polyalkylene polyamine is ethylenediamine, diethylenetriamine, triethylenetetraamine, or tetraethylenepentamine.

25. The process according to claim 24 wherein the polyalkylene polyamine is triethylenetetraamine.

26. The process according to claim 1 wherein the mineral oil-free solvent is an aromatic solvent.

27. The process according to claim 26 wherein the aromatic solvent is selected from the group consisting of toluene, xylene, light alkylate which is a mixture of low molecular weight alkylbenzene ($C_3$–$C_{9+}$), Aromatic 100, Aromatic 150, and Aromatic 200.

28. The process according to claim 27 wherein the aromatic solvent is light alkylate which is a mixture of low molecular weight alkylbenzene ($C_3$–$C_{9+}$).

29. The process according to claim 1 wherein the sediment level of the polyalkenylsuccinimide is less than 0.05 vol %, based on the total volume of the diluted product.

30. The process according to claim 1 wherein the sediment level of the polyalkenylsuccinimide is less than 0.02 vol %, based on the total volume of the diluted product.

31. The process according to claim 1 wherein the sediment level of the polyalkenylsuccinimide is less than 0.01 vol %, based on the total volume of the diluted product.

32. A product produced by a process comprising the steps of:

(a) preparing a polyalkenyl derivative of an unsaturated acidic reagent by (i) reacting a polyalkylene having a Mn of at least 300 with an unsaturated acidic reagent at elevated temperatures in the ranae of from about 180° C. to 240° C. and at a pressure below 2 atmospheres in the absence of a strong acid having a $pK_a$ of less than about 4 until at least 25% of the polyalkylene is converted to a polyalkenyl derivative of an unsaturated acidic reagent;

(ii) continuing the reaction of the polyalkylene with an excess of the unsaturated acidic reagent at elevated temperatures in the range of from about 180° C. to 240° C. and at a pressure below 2 atmospheres in the presence of a strong acid having a $pK_a$ of less than about 4 to convert at least some of the unreacted polyalkylene to additional polyalkenyl derivative of an unsaturated acidic reagent; and (iii) removing the unreacted unsaturated acidic reagent to yield an unfiltered polyalkenyl derivative of an unsaturated acidic reagent containing a sediment level of less than 0.1 wt %, based on the total weight of the polyalkenyl derivative of the unsaturated acidic reagent;

(b) reacting the product of step (a) with a polyamine having at least one basic nitrogen atom;

(c) diluting the product of step (b) with mineral oil-free solvent; and (d) subsequently filtering the diluted product of step (c) to yield a polyalkenylsuccinimide product having a sediment level less than 0.1 vol %, based on the volume of the diluted product.

* * * * *